July 5, 1966  J. E. LINDSAY  3,258,955

METHOD OF MANUFACTURING A PRESSURE SENSING ELEMENT

Filed Jan. 22, 1962

INVENTOR.
JAMES E. LINDSAY
BY
*Lyon & Lyon*
ATTORNEYS

United States Patent Office 3,258,955
Patented July 5, 1966

3,258,955
METHOD OF MANUFACTURING A PRESSURE SENSING ELEMENT
James E. Lindsay, Covina, Calif. (% American Standard Controls Div., 1401 S. Samrock Ave., Monrovia, Calif.)
Filed Jan. 22, 1962, Ser. No. 167,737
3 Claims. (Cl. 72—369)

This invention relates to a method of manufacturing pressure sensing elements. Included in the objects of this invention are:

First, to provide a method of manufacturing pressure sensing element of the Bourdon tube type comprising a single flattened tube formed into a series of end-connected helical coils, one end of the tube being connectable to a pressure source and the other end to a pointer.

Second, to provide a method of manufacturing concentric multiple coil Bourdon pressure sensing tubes wherein the concentric coils are integrally connected to each other without change in the cross section of the transition portion of the tube as it passes from the end of one coil to the next.

Third, to provide a method of manufacturing concentric multiple coil Bourdon tube wherein the concentric coils have minimum radial spacing, so that by confining the outermost coil as exemplified in the pressure gage shown in Patent No. 2,929,249 issued March 22, 1960, each tube functions to confine the next smaller coil, thereby providing a pressure sensing element which may be made sensitive to small pressure changes, but is protected against damaging expansion if subjected accidentally to excessive pressures.

Fourth, to provide a method of manufacturing a Bourdon tube type pressure sensing element and wherein pressure gages may be designed for any selected pressure range, whether for low or high pressures or extended ranges, all without the use of gears or other motion-multiplying mechanisms.

Fifth, to provide a method of manufacturing a pressure sensing element which is not only simple in construction, but also lends itself to uses under conditions in which compactness and lightweight are essential.

With the above and other objects in view, as may appear hereinafter, reference is directed to the accompanying drawings in which.

Figure 1:
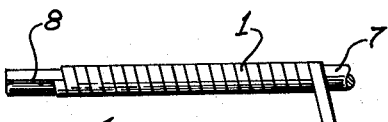
FIGURES 1 through 6 are fragmentary, side views showing the steps employed in the method of manufacture of the pressure sensing element.
Figure 2:
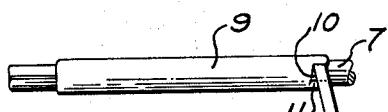
Figure 3:
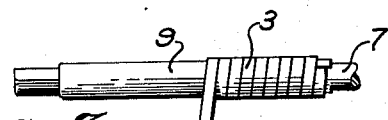
Figure 4:
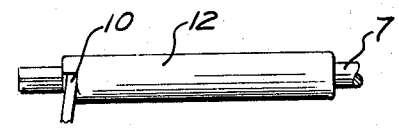
Figure 5:
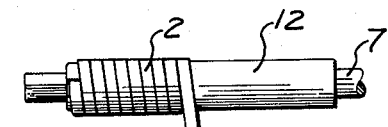
Figure 6:
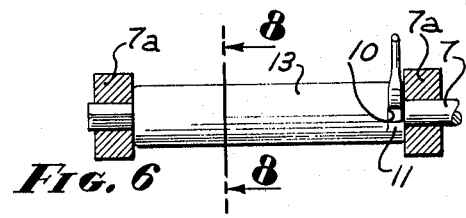

The pressure sensing element is a Bourdon tube comprising an inner coil 1, an outer coil 2, and one or more intermediate coils 3. Each coil is a multiple turn helix. The coils are disposed in concentric relation and alternate ends are joined by transition portions 4, so that the entire pressure sensing element is formed from a single flattened tube, of which one end forms a root end 5 for connection to a source of pressure to be measured and the other end forms a pointer-receiving end 6 in which is fastened a pointer, not shown.

The pressure sensing element is manufactured by wrapping the inner coil 1 about a mandrel 7. The initial or root end 5 is retained in a slit 8 provided in the mandrel 7. After the inner coil has been completed to the desired axial length, an inner sleeve 9 is fitted over the inner coil 1.

The inner sleeve 9 is provided with a notch 10 in one end which is adapted to straddle the portion of the tube extending from the inner coil 1. One side of the notch 10 is beveled, as indicated by 11, so that this portion of the tube may be wrapped over the inner sleeve 9 and form one of the transition portions 4 of the pressure sensing element.

The intermediate coil 3 is then formed by helically wrapping the tube over the first or inner sleeve 9. When this coil is completed, an intermediate sleeve 12 is slipped over the intermediate coil 3. The intermediate sleeve 12 is also provided with a notch 10 and beveled portion 11.

In the construction illustrated, the outer coil 2 is then wrapped over the intermediate sleeve 12 until the outer coil 2 is completed. An outer sleeve 13 is slipped over the outer coil 2 and the pointer-receiving end 6 of the tube is bent outwardly through the notch 10 of the outer sleeve 13.

After the coils have been wound, collars 7a are suitably secured on the mandrel to cover the ends of the sleeves and restrain the coils against axial expansion; then the entire assembly is placed in a heat-treating oven so that the coils will remain in place when the sleeves are removed. In practice, it is desirable to wind the coils short of the ends of the sleeves and form the collars of concentric rings which enter the ends of the sleeves to engage the ends of the coils. While the end 6 has been indicated as the pointer-receiving end, either end may be so used and the opposite end connected to a source of pressure.

The sleeves 9, 12, and 13 are preferably made with their walls as thin as possible, for example, in the order of thickness of the Bourdon tube, that is, in the order of .010 inch, as a consequence, the outer coils form constraining sleeves for the next inner coil.

Figure 7:
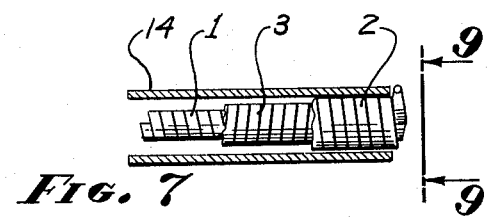
FIGURE 7 is a fragmentary, side view of the completed coil with the surrounding sheath shown in section, and with the outermost coils broken away to show the underlying coils.
Figure 8:
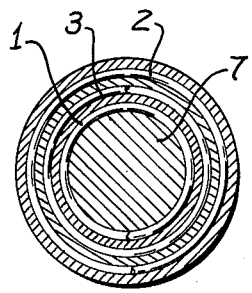
FIGURE 8 is an enlarged, transverse, sectional view through 8—8 of FIGURE 6.
Figure 9:
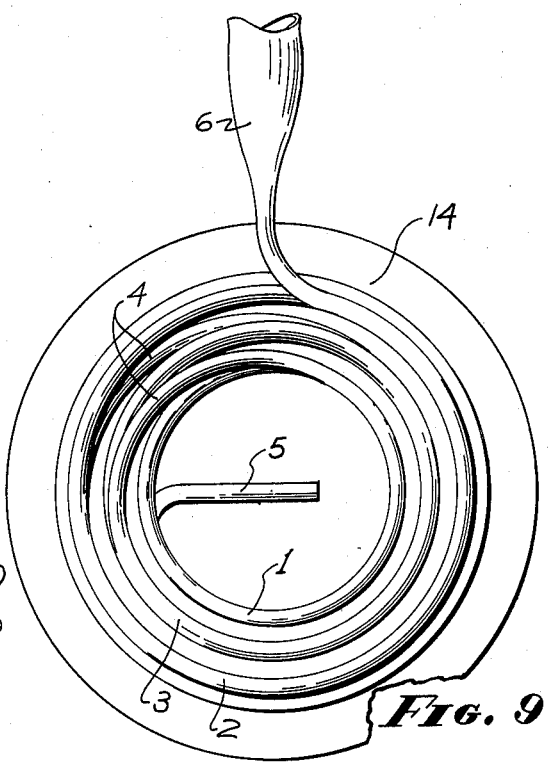
FIGURE 9 is a further enlarged, end view of the completed pressure sensing element taken from 9—9 of FIGURE 7.
Figure 10:
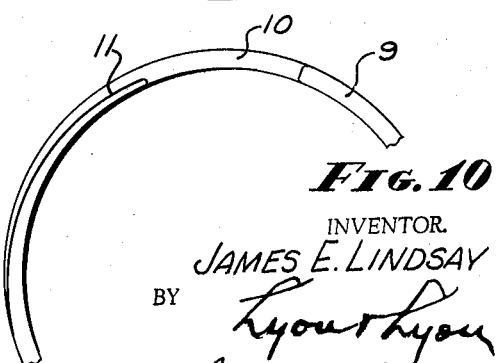
FIGURE 10 is an enlarged, fragmentary, end view of one of the sleeves employed in the manufacture of the pressure sensing element.

When the pressure sensing element is installed in a gage, it is surrounded by a confining or constraining tube 14, as indicated in FIGURES 7 and 9, so as to limit radial expansion of the outer sleeve 13. By thus controlling the expansion of the several coils comprising the pressure sensing element, the pressure sensing element may be made of extremely thin-walled tubing, which is sensitive to small changes in pressure and yet enables the gage to be used in installations where the gage may be subjected to excessive pressures.

While three concentric pressure sensing coils are shown, it should be understood that any number of coils may be used. It is preferred, however, to use odd numbers of coils so that the root end 5 and the pointer-receiving end 6 will be at opposite axial extremities of the completed pressure sensing element.

While a particular embodiment of this invention has been shown and described, it is not intended to limit the same to the exact details of the construction set forth, and it embraces such changes, modifications, and equivalents of the parts and their formation and arrangement as come within the purview of the appended claims.

What is claimed is:

1. A method of manufacturing pressure sensing elements, characterized by:
    (a) helically wrapping a first portion of a flat tube about a mandrel to form an inner multiple coil;
    (b) positioning a sleeve over said inner multiple coil;
    (c) forming an arcuate transition tube portion leading from said mandrel to said sleeve;

(d) helically wrapping a succeeding portion of said tube over said sleeve to form a second multiple coil;
(e) positioning a second sleeve over said second multiple coil;
(f) forming a transition tube portion from said first sleeve onto said second sleeve;
(g) and helically wrapping a next succeeding portion of said tube over said sleeve to form a third multiple coil.

2. A method of manufacturing pressure sensing elements, characterized by:
(a) helically wrapping a first portion of a flat tube about a mandrel to form an inner multiple coil;
(b) positioning a sleeve over said inner multiple coil;
(c) forming an arcuate transition tube portion leading from said mandrel to said sleeve;
(d) helically wrapping a succeeding portion of said tube over said sleeve to form a second multiple coil;
(e) positioning a second sleeve over said second multiple coil;
(f) and heat-treating said tube while constrained by said second sleeve.

3. A method of manufacturing pressure sensing elements, characterized by:
(a) helically wrapping a first portion of a flat tube about a mandrel to form an inner multiple coil;
(b) positioning a sleeve over said inner multiple coil;
(c) forming an arcuate transition tube portion leading from said mandrel to said sleeve;
(d) helically wrapping a succeeding portion of said tube over said sleeve to form a second multiple coil;
(e) positioning a second sleeve over said second multiple coil;
(f) forming a transition tube portion from said first sleeve onto said second sleeve;
(g) helically wrapping a next succeeding portion of said tube over said sleeve to form a third multiple coil;
(h) positioning a third sleeve over said third multiple coil;
(i) and heat-treating said tube while constrained at least by said third sleeve.

References Cited by the Examiner
UNITED STATES PATENTS

| | | | |
|---|---|---|---|
| 1,518,939 | 12/1924 | Schlaich | 73—411 XR |
| 1,691,133 | 11/1928 | Schlaich | 73—411 XR |
| 1,714,989 | 5/1929 | Schlaich | 73—418 XR |
| 2,569,612 | 10/1951 | Laurent | 29—452 |
| 2,743,514 | 5/1956 | Duecy | 29—452 |
| 2,771,934 | 11/1956 | Payne | 72—137 XR |
| 2,841,866 | 7/1958 | Schilling | 29—423 |
| 2,929,249 | 3/1960 | Lindsay | 73—418 |
| 2,943,489 | 7/1960 | Haigler | 73—418 |

CHARLIE T. MOON, *Primary Examiner.*
ROBERT EVANS, R. J. ERICKSON,
*Assistant Examiners.*